(12) United States Patent
Paladugu et al.

(10) Patent No.: US 12,289,757 B2
(45) Date of Patent: Apr. 29, 2025

(54) TIME-DIVISION MULTIPLEXING OF UPLINK COMMUNICATIONS DURING MAKE-BEFORE-BREAK HANDOVER

(71) Applicant: QUALCOMM Incorporated, San Diego, CA (US)

(72) Inventors: Karthika Paladugu, Hyderabad (IN); Ozcan Ozturk, San Diego, CA (US); Peter Gaal, San Diego, CA (US); Prasad Reddy Kadiri, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/409,100

(22) Filed: Jan. 10, 2024

(65) Prior Publication Data

US 2024/0147520 A1    May 2, 2024

Related U.S. Application Data

(63) Continuation of application No. 16/928,705, filed on Jul. 14, 2020, now Pat. No. 11,895,694.
(Continued)

(51) Int. Cl.
*H04W 72/566* (2023.01)
*H04L 5/22* (2006.01)
(Continued)

(52) U.S. Cl.
CPC ............ *H04W 72/569* (2023.01); *H04L 5/22* (2013.01); *H04W 36/08* (2013.01); *H04W 36/18* (2013.01);
(Continued)

(58) Field of Classification Search
None
See application file for complete search history.

(56) References Cited

U.S. PATENT DOCUMENTS

| 2013/0201959 A1 | 8/2013 | Guo et al. |
| 2016/0014753 A1 | 1/2016 | Wu et al. |

(Continued)

FOREIGN PATENT DOCUMENTS

| CN | 103428763 A | 12/2013 |
| CN | 105917719 A | 8/2016 |

(Continued)

OTHER PUBLICATIONS

English Translation of CN 103428763 A (Year: 2013).*
(Continued)

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment (UE) may receive a message indicating that the UE is to execute a make-before-break handover procedure. The UE may transmit, during the make-before-break handover procedure and based at least in part on a prioritization rule, a first uplink communication to a target base station. The prioritization rule may indicate a relative priority for different uplink communications included in a group of uplink communications. The group of uplink communications may include at least the first uplink communication to be transmitted by the UE to the target base station and a second uplink communication to be transmitted by the UE to a source base station during the make-before-break handover procedure. Numerous other aspects are described.

20 Claims, 8 Drawing Sheets

600 ⟶

610 — Determine a prioritization rule that indicates a relative priority for different uplink communications included in a group of uplink communications, wherein the group of uplink communications includes at least a first uplink communication and a second uplink communication to be transmitted by a UE using time-division multiplexing during a make-before-break handover procedure 620 — Transmit, based at least in part on the prioritization rule, the first uplink communication to a target base station and the second uplink communication to a source base station using time-division multiplexing during the make-before-break handover procedure

Related U.S. Application Data

(60) Provisional application No. 62/880,354, filed on Jul. 30, 2019.

(51) Int. Cl.
*H04W 36/08* (2009.01)
*H04W 36/18* (2009.01)
*H04W 72/1268* (2023.01)
*H04W 72/21* (2023.01)

(52) U.S. Cl.
CPC ....... *H04W 72/1268* (2013.01); *H04W 72/21* (2023.01)

(56) References Cited

U.S. PATENT DOCUMENTS

| | | |
|---|---|---|
| 2020/0359277 A1 | 11/2020 | Liu |
| 2021/0037547 A1 | 2/2021 | Paladugu et al. |
| 2021/0037591 A1 | 2/2021 | Niu et al. |
| 2021/0378040 A1 | 12/2021 | Peng et al. |
| 2022/0046494 A1 | 2/2022 | Yiu |
| 2022/0124587 A1* | 4/2022 | Awada ............... H04W 36/22 |
| 2022/0141736 A1* | 5/2022 | Muller ............ H04W 36/0016 370/331 |

FOREIGN PATENT DOCUMENTS

| | | | |
|---|---|---|---|
| CN | 109804678 A | 5/2019 | |
| EP | 3131335 A1 * | 2/2017 | ........ H04W 36/0077 |
| EP | 3416452 A1 | 12/2018 | |
| WO | 2016090124 | 6/2016 | |
| WO | 2018031110 A1 | 2/2018 | |
| WO | 2018175577 A1 | 9/2018 | |
| WO | 2019161099 A1 | 8/2019 | |

OTHER PUBLICATIONS

Huawei., et al., "Close to 0 ms HO Interruption Time for Single Tx/Rx UE", 3GPP Draft, 3GPP TSG-RAN WG2 #97bis, R2-1703382 Close to 0 ms HO Interruption Time for Single Tx-Rx UE, 3rd Generation Partnership Project (3GPP), Mobile Competence Centre, 650, Route Des Lucioles, F-06921 Sophia-Antipolis, vol. RAN WG2, No. Spokane, US, Apr. 3, 2017-Apr. 7, 2017, Apr. 3, 2017 (Apr. 3, 2017), XP051245244, 8 pages, para 2.2, 2.3.
International Search Report and Written Opinion—PCT/US2020/042088—ISA/EPO—Nov. 30, 2020.
Partial International Search Report—PCT/US2020/042088—ISA/EPO—Oct. 7, 2020.

* cited by examiner

TIME-DIVISION MULTIPLEXING OF UPLINK COMMUNICATIONS DURING MAKE-BEFORE-BREAK HANDOVER

CROSS-REFERENCE TO RELATED APPLICATIONS

This application is a continuation of U.S. patent application Ser. No. 16/928,705, filed Jul. 14, 2020, titled "TIME-DIVISION MULTIPLEXING OF UPLINK COMMUNICATIONS DURING MAKE-BEFORE-BREAK HANDOVER," which claims priority to U.S. Provisional Patent Application No. 62/880,354, filed on Jul. 30, 2019, titled "TIME-DIVISION MULTIPLEXING OF UPLINK COMMUNICATIONS DURING MAKE-BEFORE-BREAK HANDOVER," and assigned to the assignee hereof. The contents of which are incorporated herein by reference in their entireties.

FIELD OF THE DISCLOSURE

Aspects of the present disclosure generally relate to wireless communication and to techniques and apparatuses for time-division multiplexing of uplink communications during make-before-break handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a prioritization rule that indicates a relative priority for different uplink communications included in a group of uplink communications, wherein the group of uplink communications includes at least a first uplink communication and a second uplink communication to be transmitted by the UE using time-division multiplexing during a make-before-break handover procedure; and transmitting, based at least in part on the prioritization rule, the first uplink communication to a target base station and the second uplink communication to a source base station using time-division multiplexing during the make-before-break handover procedure.

In some aspects, a method of wireless communication, performed by a source base station, may include receiving, from a target base station, an indication of a set of resources available for uplink communications between a UE and the target base station during a make-before-break handover procedure; determining a timing for an uplink communication between the UE and the source base station during the make-before-break handover procedure based at least in part on the indication, wherein the timing does not conflict with the set of resources available for uplink communications between the UE and the target base station; and transmitting a grant to the UE, wherein the grant indicates the timing for the uplink communication between the UE and the source base station.

In some aspects, a method of wireless communication, performed by a target base station, may include receiving, from a source base station, an indication of a first set of resources configured for uplink communications between a UE and the source base station during a make-before-break handover procedure; transmitting, to the source base station, an indication of a second set of resources available for uplink communications between the UE and the target base station during the make-before-break handover procedure; determining a timing for an uplink communication between the UE and the target base station during the make-before-break handover procedure based at least in part on the first set of resources and the second set of resources, wherein the timing does not conflict with the first set of resources; and transmitting a grant to the UE, wherein the grant indicates the timing for the uplink communication between the UE and the target base station.

In some aspects, a UE for wireless communication may include memory and one or more processors operatively coupled to the memory. The memory and the one or more processors may be configured to determine a prioritization rule that indicates a relative priority for different uplink communications included in a group of uplink communications, wherein the group of uplink communications includes at least a first uplink communication and a second uplink communication to be transmitted by the UE using time-division multiplexing during a make-before-break handover procedure; and transmit, based at least in part on the prioritization rule, the first uplink communication to a target base station and the second uplink communication to a source base station using time-division multiplexing during the make-before-break handover procedure.

In some aspects, a source base station for wireless communication may include memory and one or more processors operatively coupled to the memory. The memory and the one or more processors may be configured to receive, from a target base station, an indication of a set of resources available for uplink communications between a UE and the target base station during a make-before-break handover procedure; determine a timing for an uplink communication between the UE and the source base station during the make-before-break handover procedure based at least in part on the indication, wherein the timing does not conflict with the set of resources available for uplink communications between the UE and the target base station; and transmit a grant to the UE, wherein the grant indicates the timing for the uplink communication between the UE and the source base station.

In some aspects, a target base station for wireless communication may include memory and one or more processors operatively coupled to the memory. The memory and the one or more processors may be configured to receive, from a source base station, an indication of a first set of resources configured for uplink communications between a UE and the source base station during a make-before-break handover procedure; transmit, to the source base station, an indication of a second set of resources available for uplink communications between the UE and the target base station during the make-before-break handover procedure; determine a timing for an uplink communication between the UE and the target base station during the make-before-break handover procedure based at least in part on the first set of resources and the second set of resources, wherein the timing does not conflict with the first set of resources; and transmit a grant to the UE, wherein the grant indicates the timing for the uplink communication between the UE and the target base station.

In some aspects, a non-transitory computer-readable medium may store one or more instructions for wireless communication. The one or more instructions, when executed by one or more processors of a UE, may cause the one or more processors to: determine a prioritization rule that indicates a relative priority for different uplink communications included in a group of uplink communications, wherein the group of uplink communications includes at least a first uplink communication and a second uplink communication to be transmitted by the UE using time-division multiplexing during a make-before-break handover procedure; and transmit, based at least in part on the prioritization rule, the first uplink communication to a target base station and the second uplink communication to a source base station using time-division multiplexing during the make-before-break handover procedure.

In some aspects, a non-transitory computer-readable medium may store one or more instructions for wireless communication. The one or more instructions, when executed by one or more processors of a source base station, may cause the one or more processors to: receive, from a target base station, an indication of a set of resources available for uplink communications between a UE and the target base station during a make-before-break handover procedure; determine a timing for an uplink communication between the UE and the source base station during the make-before-break handover procedure based at least in part on the indication, wherein the timing does not conflict with the set of resources available for uplink communications between the UE and the target base station; and transmit a grant to the UE, wherein the grant indicates the timing for the uplink communication between the UE and the source base station.

In some aspects, a non-transitory computer-readable medium may store one or more instructions for wireless communication. The one or more instructions, when executed by one or more processors of a target base station, may cause the one or more processors to: receive, from a source base station, an indication of a first set of resources configured for uplink communications between a UE and the source base station during a make-before-break handover procedure; transmit, to the source base station, an indication of a second set of resources available for uplink communications between the UE and the target base station during the make-before-break handover procedure; determine a timing for an uplink communication between the UE and the target base station during the make-before-break handover procedure based at least in part on the first set of resources and the second set of resources, wherein the timing does not conflict with the first set of resources; and transmit a grant to the UE, wherein the grant indicates the timing for the uplink communication between the UE and the target base station.

In some aspects, an apparatus for wireless communication may include means for determining a prioritization rule that indicates a relative priority for different uplink communications included in a group of uplink communications, wherein the group of uplink communications includes at least a first uplink communication and a second uplink communication to be transmitted by the apparatus using time-division multiplexing during a make-before-break handover procedure; and means for transmitting, based at least in part on the prioritization rule, the first uplink communication to a target base station and the second uplink communication to a source base station using time-division multiplexing during the make-before-break handover procedure.

In some aspects, an apparatus for wireless communication may include means for receiving, from a target base station, an indication of a set of resources available for uplink communications between a UE and the target base station during a make-before-break handover procedure; means for determining a timing for an uplink communication between the UE and the apparatus during the make-before-break handover procedure based at least in part on the indication, wherein the timing does not conflict with the set of resources available for uplink communications between the UE and the target base station; and means for transmitting a grant to the UE, wherein the grant indicates the timing for the uplink communication between the UE and the apparatus.

In some aspects, an apparatus for wireless communication may include means for receiving, from a source base station, an indication of a first set of resources configured for uplink communications between a UE and the source base station during a make-before-break handover procedure; means for transmitting, to the source base station, an indication of a second set of resources available for uplink communications between the UE and the apparatus during the make-before-break handover procedure; means for determining a timing for an uplink communication between the UE and the apparatus during the make-before-break handover procedure based at least in part on the first set of resources and the second set of resources, wherein the timing does not conflict with the first set of resources; and means for transmitting a grant to the UE, wherein the grant indicates the timing for the uplink communication between the UE and the apparatus.

Aspects generally include a method, apparatus, system, computer program product, non-transitory computer-readable medium, user equipment, base station, source base station, target base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
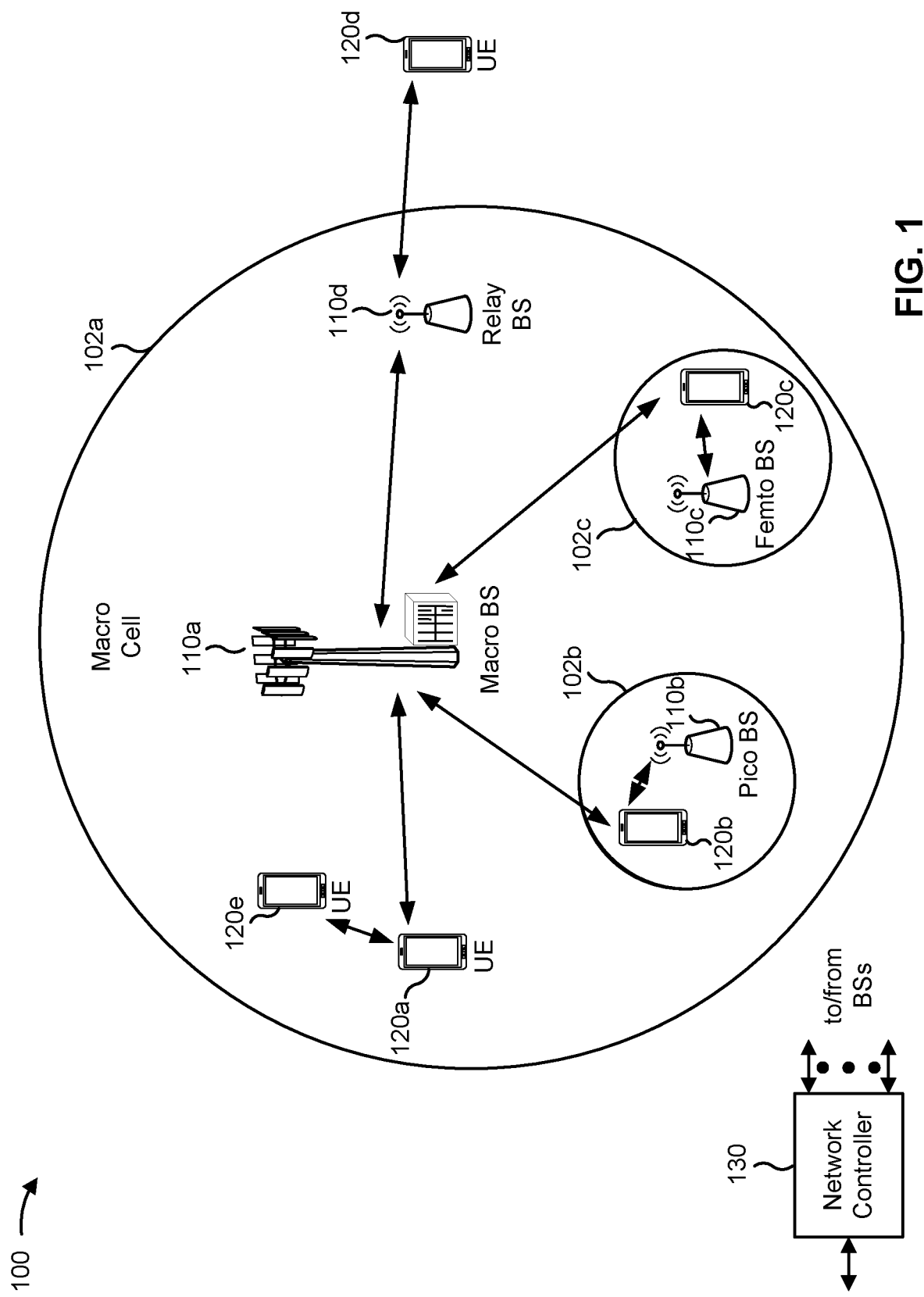
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
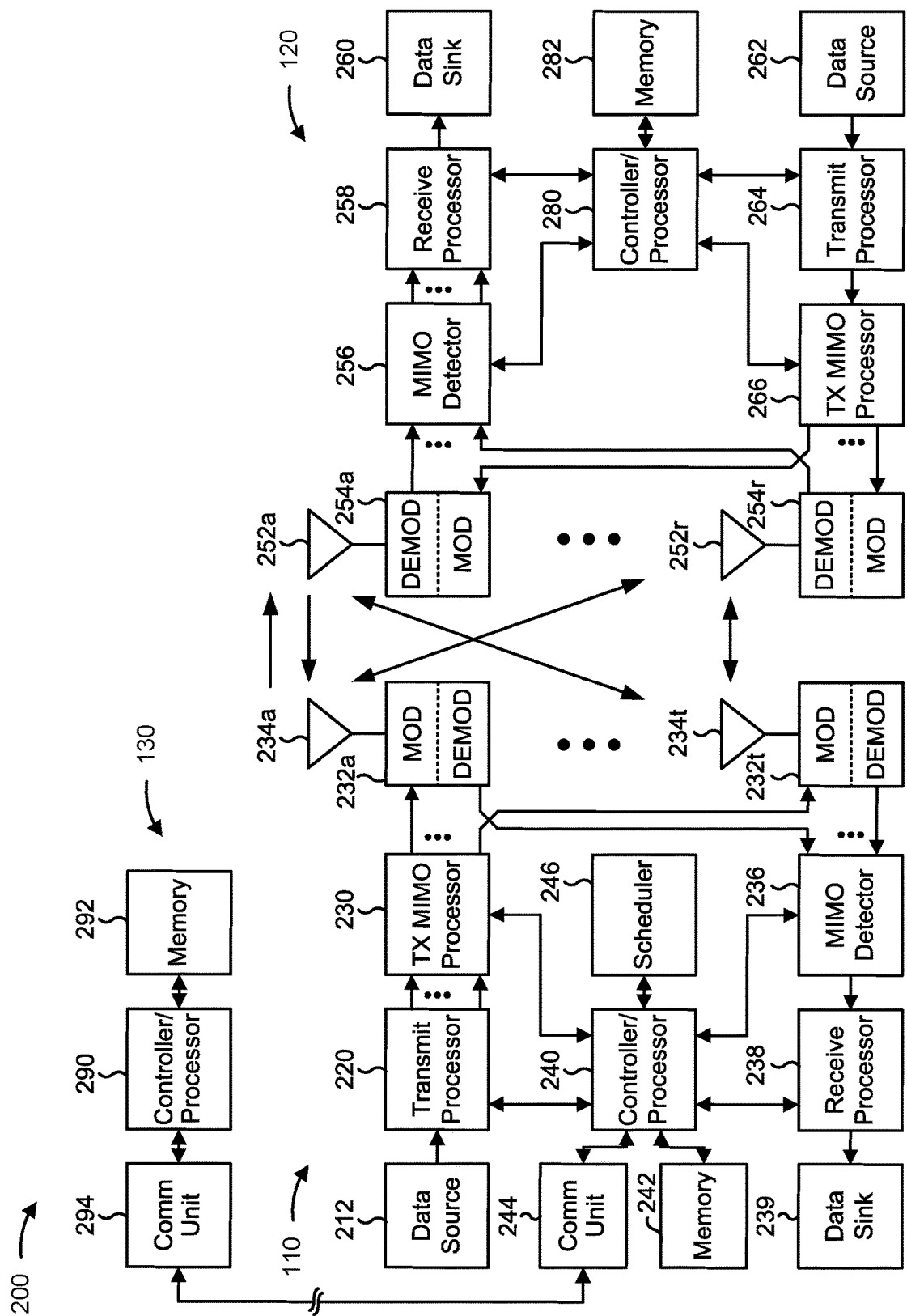
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with time-division multiplexing of uplink communications during make-before-break handover, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, and/or other processes as described herein. A scheduler 246 may schedule UEs for data transmission on the downlink and/or uplink.

In some aspects, UE 120 may include means for determining a prioritization rule that indicates a relative priority for different uplink communications included in a group of uplink communications, wherein the group of uplink communications includes at least a first uplink communication and a second uplink communication to be transmitted by the UE 120 using time-division multiplexing during a make-before-break handover procedure; means for transmitting, based at least in part on the prioritization rule, the first uplink communication to a target base station and the second uplink communication to a source base station using time-division multiplexing during the make-before-break handover procedure; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a source base station (e.g., base station 110) may include means for receiving, from a target base station, an indication of a set of resources available for uplink communications between a UE and the target base station during a make-before-break handover procedure; means for determining a timing for an uplink communication between the UE and the source base station during the make-before-break handover procedure based at least in part on the indication, wherein the timing does not conflict with the set of resources available for uplink communications between the UE and the target base station; means for transmitting a grant to the UE, wherein the grant indicates the timing for the uplink communication between the UE and the source base station; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a target base station (e.g., base station 110) may include means for receiving, from a source base station, an indication of a first set of resources configured for uplink communications between a UE and the source base station during a make-before-break handover procedure; means for transmitting, to the source base station, an indication of a second set of resources available for uplink communications between the UE and the target base station during the make-before-break handover procedure; means for determining a timing for an uplink communication between the UE and the target base station during the make-before-break handover procedure based at least in part on the first set of resources and the second set of resources, wherein the timing does not conflict with the first set of resources; means for transmitting a grant to the UE, wherein the grant indicates the timing for the uplink communication between the UE and the target base station; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
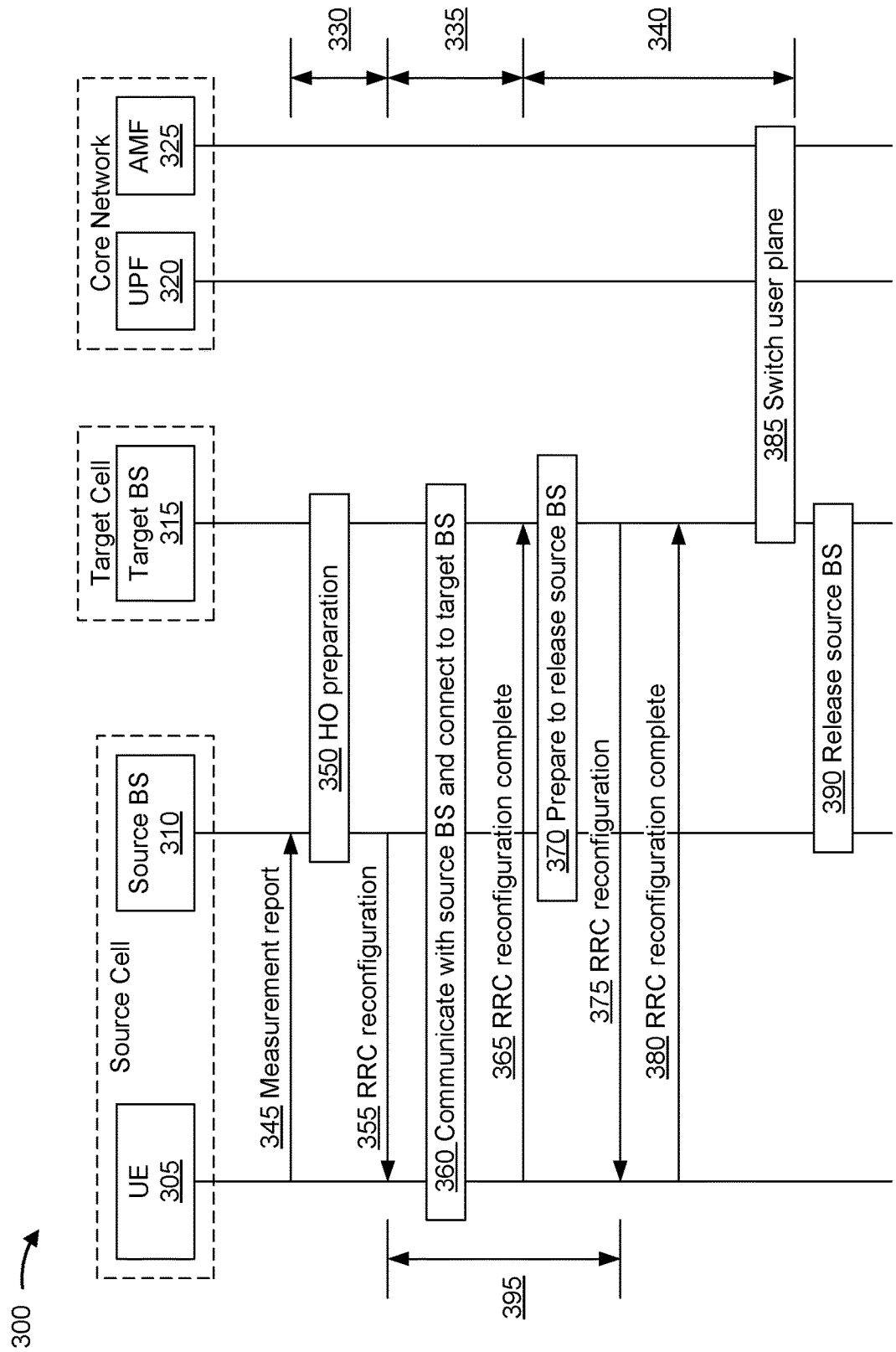
FIG. 3 is a diagram illustrating an example of make-before-break handover, in accordance with various aspects of the present disclosure.

FIG. 3 is a diagram illustrating an example 300 of make-before-break handover, in accordance with various aspects of the present disclosure.

As shown in FIG. 3, a make-before-break (MBB) handover procedure may involve a UE 305, a source base station 310, a target base station 315, a user plane function (UPF) device 320, and an access and mobility management function (AMF) device 325. The UE 305 may correspond to the UE 120 described elsewhere herein. The source base station 310 and/or the target base station 315 may correspond to the base station 110 described elsewhere herein. The UPF device 320 and/or the AMF device 325 may correspond to the network controller 130 described elsewhere herein. The UE 305 and the source base station 310 may be connected (e.g., may have a radio resource control (RRC) connection) via a serving cell or a source cell, and the UE 305 may undergo a handover to the target base station 315 via a target cell. The UPF device 320 and/or the AMF device 325 may be located within a core network. The source base station 310 and the target base station 315 may be in communication with the core network for mobility support and user plane functions. The MBB handover procedure may include an enhanced MBB (eMBB) handover procedure.

As shown, the MBB handover procedure may include a handover preparation phase 330, a handover execution phase 335, and a handover completion phase 340. During the handover preparation phase 330, the UE 305 may report measurements that cause the source base station 310 and/or the target base station 315 to prepare for handover and trigger execution of the handover. During the handover execution phase 335, the UE 305 may execute the handover by performing a random access procedure with the target base station 315 and establishing an RRC connection with the target base station 315. During the handover completion phase 340, the source base station 310 may forward stored communications associated with the UE 305 to the target base station 315, and the UE 305 may be released from a connection with the source base station 310.

As shown by reference number 345, the UE 305 may perform one or more measurements, and may transmit a measurement report to the source base station 310 based at least in part on performing the one or more measurements (e.g., serving cell measurements, neighbor cell measurements, and/or the like). The measurement report may indicate, for example, a reference signal received power (RSRP) parameter, a reference signal received quality (RSRQ) parameter, a received signal strength indicator (RSSI) parameter, a signal-to-interference-plus-noise-ratio (SINR) parameter, and/or the like (e.g., for the serving cell, one or more neighbor cells, and/or the like). The source base station 310 may use the measurement report to determine whether to trigger a handover to the target base station 315. For example, if one or more measurements satisfy a condition, then the source base station 310 may trigger a handover of the UE 305 to the target base station 315.

As shown by reference number 350, the source base station 310 and the target base station 315 may communicate with one another to prepare for a handover of the UE 305. As part of the handover preparation, the source base station 310 may transmit a handover request to the target base station 315 to instruct the target base station 315 to prepare for the handover. The source base station 310 may communicate radio resource control (RRC) context information associated with the UE 305 and/or configuration information associated with the UE 305 to the target base station 315. The target base station 315 may prepare for the handover by reserving resources for the UE 305. After reserving the resources, the target base station 315 may transmit an acknowledgement (ACK) to the source base station 310 in response to the handover request.

As shown by reference number 355, the source base station 310 may transmit an RRC reconfiguration message to the UE 305. The RRC reconfiguration message may include a handover command instructing the UE 305 to execute a handover procedure from the source base station 310 to the target base station 315. The handover command may include information associated with the target base station 315, such as a random access channel (RACH) preamble assignment for accessing the target base station 315. Reception of the RRC reconfiguration message, including the handover command, by the UE 305 may trigger the start of the handover execution phase 335.

As shown by reference number 360, during the handover execution phase 335 of the MBB handover, the UE 305 may execute the handover by performing a random access procedure with the target base station 315 (e.g., including synchronization with the target base station 315) while continuing to communicate with the source base station 310. For example, while the UE 305 is performing the random access procedure with the target base station 315, the UE 305 may transmit uplink data, uplink control information, an uplink reference signal (e.g., a sounding reference signal), and/or the like to the source base station 310, and/or may receive downlink data, downlink control information, a downlink reference signal, and/or the like from the source base station 310.

As shown by reference number 365, upon successfully establishing a connection with the target base station 315 (e.g., via a random access procedure), the UE may transmit an RRC reconfiguration completion message to the target base station 315. Reception of the RRC reconfiguration message by the target base station 315 may trigger the start of the handover completion phase 340.

As shown by reference number 370, the source base station 310 and the target base station 315 may communicate with one another to prepare for release of the connection between the source base station 310 and the UE 305. In some aspects, the target base station 315 may determine that a connection between the source base station 310 and the UE 305 is to be released, such as after receiving the RRC reconfiguration message from the UE 305. In this case, the target base station 315 may transmit a handover connection setup completion message to the source base station 310. The handover connection setup completion message may cause the source base station 310 to stop transmitting data to the UE 305 and/or to stop receiving data from the UE 305. Additionally, or alternatively, the handover connection setup completion message may cause the source base station 310 to forward communications associated with the UE 305 to the target base station 315 and/or to notify the target base station 315 of a status of one or more communications with the UE 305. For example, the source base station 310 may forward, to the target base station 315, buffered downlink communications (e.g., downlink data) for the UE 305 and/or uplink communications (e.g., uplink data) received from the UE 305. Additionally, or alternatively, the source base station 310 may notify the target base station 315 regarding a packet data convergence protocol (PDCP) status associated with the UE 305, a sequence number to be used for a downlink communication with the UE 305, and/or the like.

As shown by reference number 375, the target base station 315 may transmit an RRC reconfiguration message to the UE 305 to instruct the UE 305 to release the connection with the source base station 310. Upon receiving the instruction to release the connection with the source base station 310, the UE 305 may stop communicating with the source base station 310. For example, the UE 305 may refrain from transmitting uplink communications to the source base station 310 and/or may refrain from monitoring for downlink communications from the source base station 310.

As shown by reference number 380, the UE may transmit an RRC reconfiguration completion message to the target base station 315 to indicate that the connection between the source base station 310 and the UE 305 is being released or has been released.

As shown by reference number 385, the target base station 315, the UPF device 320, and/or the AMF device 325 may communicate to switch a user plane path of the UE 305 from the source base station 310 to the target base station 315. Prior to switching the user plane path, downlink communications for the UE 305 may be routed through the core network to the source base station 310. After the user plane path is switched, downlink communications for the UE 305 may be routed through the core network to the target base station 315. Upon completing the switch of the user plane path, the AMF device 325 may transmit an end marker message to the source base station 310 to signal completion of the user plane path switch. As shown by reference number 390, the target base station 315 and the source base station 310 may communicate to release the source base station 310.

As part of the MBB handover procedure, the UE 305 may maintain simultaneous connections with the source base station 310 and the target base station 315 during a time period 395. The time period 395 may start at the beginning of the handover execution phase 335 (e.g., upon reception by the UE 305 of a handover command from the source base station 310) when the UE 305 performs a random access procedure with the target base station 315. The time period 395 may end upon release of the connection between the UE 305 and the source base station 310 (e.g., upon reception by the UE 305 of an instruction, from the target base station 315, to release the source base station 310). By maintaining simultaneous connections with the source base station 310 and the target base station 315, the handover procedure can be performed with zero or a minimal interruption to communications, thereby reducing latency. However, some UEs 305 may not be capable of performing simultaneous transmissions over two communication links. For example, a UE 305 may include a single transmit chain, and thus can only transmit on one link at a time. In some other examples, a UE may include multiple transmit chains, but may not be able to transmit on both links due to an incompatible band combination (e.g., an intra-frequency handover) and/or interference issues.

Some techniques and apparatuses described herein permit a UE 305 that cannot simultaneously transmit on different links to perform MBB handover with minimal interruption to communications, thereby reducing latency. For example, the UE 305 may use time-division multiplexing (TDM) to transmit uplink communications via a first connection with the source base station 310 and a second connection with the target base station 315. Some techniques and apparatuses described herein permit the UE 305 to transmit uplink communications using TDM according to a prioritization rule that prioritizes some communications over other communications to reduce latency and interruption time. Furthermore, some techniques and apparatuses described herein permit the UE 305 to use TDM for communications on different links in a dynamic manner, without being configured with a semi-static TDM pattern. In this way, latency may be reduced because a semi-static TDM pattern may lead to delays when the UE 305 needs to wait for a semi-statically configured uplink transmission time interval (TTI) (e.g., a slot, a subframe, and/or the like) to transmit an uplink communication.

As indicated above, FIG. 3 is provided as an example. Other examples may differ from what is described with respect to FIG. 3.

Figure 4:
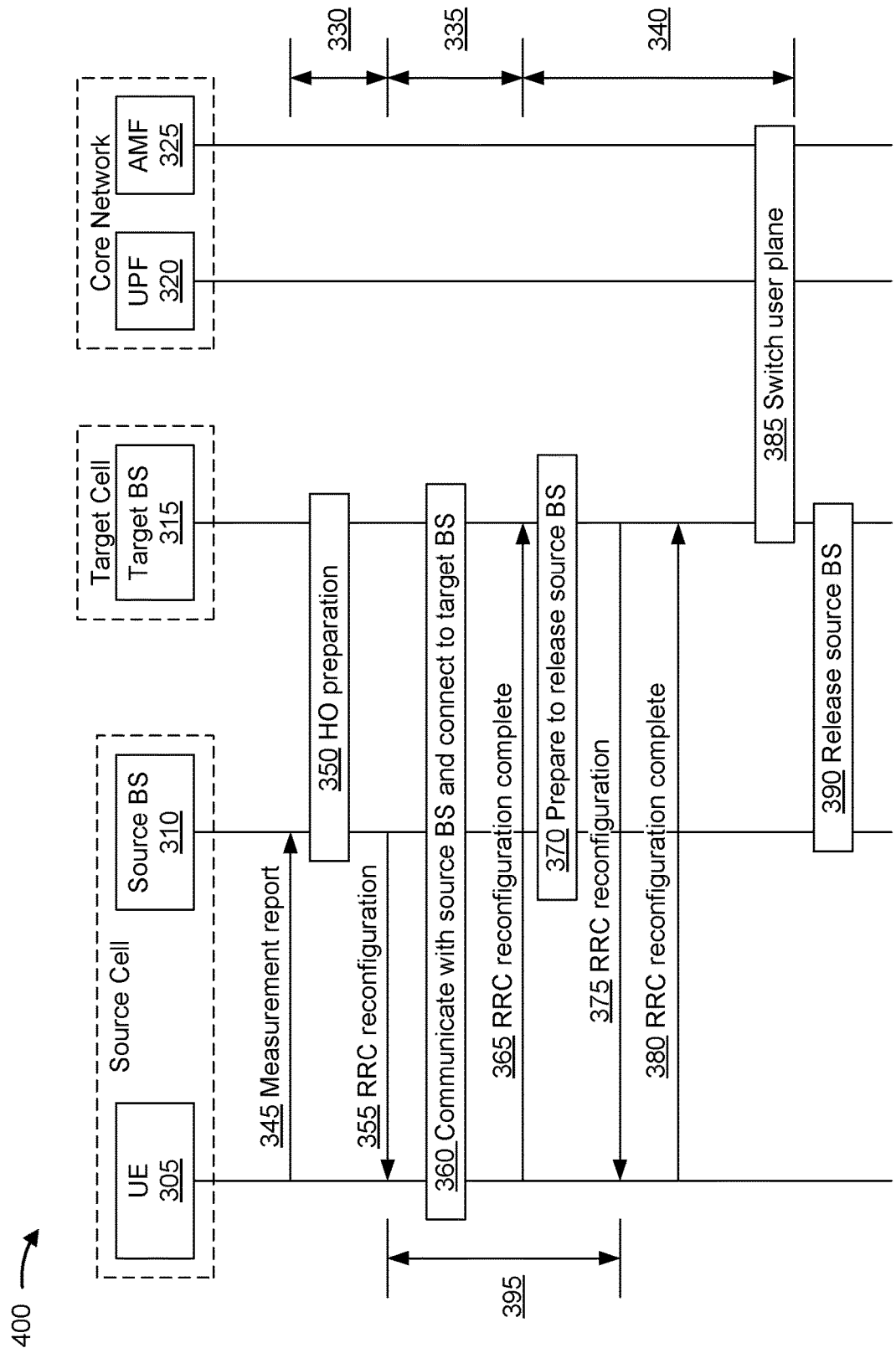
FIG. 4 is a diagram illustrating an example of time-division multiplexing of uplink communications during make-before-break handover, in accordance with various aspects of the present disclosure.

FIG. 4 is a diagram illustrating an example 400 of time-division multiplexing of uplink communications during make-before-break handover, in accordance with various aspects of the present disclosure.

As described above in connection with FIG. 3, an MBB handover procedure may involve a UE 305, a source base station 310, a target base station 315, UPF device 320, and an AMF device 325. As also described above in connection with FIG. 3, the MBB handover procedure may include a handover preparation phase 330, a handover execution phase 335, and a handover completion phase 340. In some aspects, the UE 305 supports multiple layer 2 protocol stacks (e.g., at least two independent layer 2 protocol stacks) to support TDM of uplink communications via a first connection with the source base station 310 and a second connection with the target base station 315.

During the handover preparation phase 330, the source base station 310 and the target base station 315 may communicate with one another to prepare for a handover of the UE 305, as described above in connection with reference number 350 of FIG. 3. As shown by reference number 405, the source base station 310 may transmit, to the target base station 315, a handover request that instructs the target base station 315 to prepare for MBB handover. As shown, the handover request may include source resource coordination information.

In some aspects, the source resource coordination information may indicate a first set of resources (e.g., time resources, frequency resources, physical resource blocks, spatial resources, and/or the like) configured for uplink communications between the UE 305 and the source base station 310 during the MBB handover procedure. For example, the first set of resources may include one or more resources configured for a sounding reference signal (SRS) from the UE 305 to the source base station 310, one or more resources configured for a physical uplink control channel (PUCCH) communication from the UE 305 to the source base station 310, one or more resources configured for a physical uplink shared channel (PUSCH) communication from the UE 305 to the source base station 310, and/or the like. In some aspects, the PUSCH communication may include a non-data communication, such as uplink control information (UCI), a channel state information (CSI) report, acknowledgement (ACK) or negative acknowledgement (NACK) feedback (collectively, ACK/NACK feedback), a radio link control (RLC) status report, and/or the like. Thus, the first set of resources may be configured for uplink control communications and/or uplink reference signals between the UE 305 and the source base station 310. In some aspects, the source base station 310 may configure the first set of resources for the UE 305, such as by using a configuration indicated in an RRC message.

As shown by reference number 410, the target base station 315 may transmit, to the source base station 310, an ACK in response to the handover request (e.g., shown as a handover request ACK). As shown, the handover request ACK may include target resource coordination information.

In some aspects, the target resource coordination information may indicate a second set of resources available for uplink communications between the UE 305 and the target base station 315 during the MBB handover procedure. For example, the second set of resources may include one or more resources configured for UE 305 to perform a random access procedure with the target base station 315, such as one or more resources configured for an uplink random access message, a random access preamble, a random access payload, an uplink random access channel (RACH) message (sometimes referred to as an uplink physical RACH (PRACH) message), a PUSCH message transmitted during a random access procedure, msg1 of a four-step RACH procedure, msg3 of a four-step RACH procedure, msgA of a two-step RACH procedure, and/or the like. In some aspects, the target base station 315 may broadcast information that identifies the second set of resources in system information, such as a system information block (SIB).

In some aspects, the source base station 310 and the target base station 315 may be synchronized. For example, communications and/or TTIs (e.g., subframes, slots, and/or the like) of the source base station 310 and the target base station 315 may be time-aligned. In this case, the source base station 310 and the target base station 315 may not need to account for timing mis-alignments when scheduling uplink communications.

However, if the source base station 310 and the target base station 315 are not synchronized, then the source base station 310 and/or the target base station 315 may need to account for timing mis-alignments when scheduling uplink communications. In this case, the source base station 310 may indicate, to the target base station 315 (e.g., in the handover request), a timing offset. The timing offset may indicate an offset in timing between the source base station 310 and the target base station 315 (e.g., a difference between TTI boundaries). In some aspects, the UE 305 may indicate a timing offset between the UE 305 and the target base station 315 and/or a timing offset between the source base station 310 and the target base station 315. In some aspects, the UE 305 may determine the timing offset based at least in part on a propagation delay observed between the UE 305 and one or both of the source base station 310 and the target base station 315. In some aspects, the source base station 310 may use this timing offset to identify the second set of resources (e.g., a set of time domain resources) available for uplink communications between the UE 305 and the target base station 315 during the MBB handover procedure. Additionally, or alternatively, the source base station 310 may indicate the timing offset to the target base station 315, and the target base station 315 may use the timing offset when indicating the second set of resources to the source base station 310.

In some aspects, the source base station 310 and the target base station 315 may use the same numerology (e.g., a sub-carrier spacing (SCS) and/or the like). In this case, the source base station 310 and the target base station 315 may not need to account for different numerologies when scheduling uplink communications.

However, if the source base station 310 and the target base station 315 use different numerologies, then the source base station 310 and/or the target base station 315 may need to account for potential mis-alignments due to different numerologies when scheduling uplink communications. In this case, the source base station 310 may indicate, to the target base station 315 (e.g., in the handover request), a numerology being used for communications between the UE 305 and the source base station 310, one or more numerologies supported by the source base station 310 and/or the UE 305, and/or the like. Additionally, or alternatively, the target base station 315 may indicate, to the source base station 310 (e.g., in the handover request ACK), one or more numerologies supported by the target base station 315. The source base station 310 and the target base station 315 may account for these numerologies when indicating the first set of resources, when indicating the second set of resources, when scheduling timing of uplink communications, and/or the like. In some aspects, the source base station 310 and the target base station 315 may determine to use a same numerology for such operations, such as a numerology supported by both the source base station 310 and the target base station 315, a numerology configured for communications between the UE 305 and the source base station 310, a lowest numerology between the source base station 310 and the target base station 315, and/or the like.

As shown by reference number 415, the source base station 310 may transmit an RRC reconfiguration message to the UE 305. The RRC reconfiguration message may include a handover command instructing the UE 305 to execute an MBB handover procedure from the source base station 310 to the target base station 315. As shown, the RRC reconfiguration message may indicate that TDM is enabled for the MBB handover procedure. In some aspects, the source base station 310 may indicate that TDM is enabled for the MBB handover procedure based at least in part on a capability of the UE 305. For example, if the UE 305 does not support multiple transmit chains and/or multiple transmit antennas, then the source base station 310 may indicate that TDM is enabled for the MBB handover procedure. In some aspects, if the UE 305 supports multiple chains and/or multiple transmit antennas, then the source base station 310 may indicate that TDM is disabled for the MBB handover procedure. Reception of the handover command by the UE 305 may trigger the start of the handover execution phase 335, as described above in connection with reference number 355 of FIG. 3.

As shown by reference number 420, the UE 305 may determine a prioritization rule for prioritizing uplink communications with the source base station 310 and the target base station 315. In some aspects, the UE 305 may determine the prioritization rule based at least in part on receiving the handover command with the indication that TDM is enabled during MBB handover. The prioritization rule may be stored in memory of the UE 305 (e.g., rather than being signaled to the UE 305 by the base station 315). The prioritization rule may indicate a relative priority for different uplink communications included in a group of uplink communications to be transmitted by the UE 305 during the MBB handover procedure. The group of uplink communications may include a first uplink communication to be transmitted by the UE 305 to the target base station 315 using TDM during the MBB handover procedure. The group of uplink communications may further include a second uplink communication to be transmitted by the UE 305 to the source base station 310 using TDM during the MBB handover procedure. In some aspects, the group of uplink communications may include multiple uplink communications to be transmitted to the target base station 315 and/or multiple uplink communications to be transmitted to the source base station 310. In some aspects, the prioritization rule may indicate a relative priority for different types of uplink communications included in the group of uplink communications.

In some aspects, the prioritization rule may indicate that uplink communications to the target base station 315 have a higher priority than uplink communications to the source base station 310 during the MBB handover procedure. When a first uplink communication has a higher priority than a second uplink communication, the UE 305 may transmit the first uplink communication before the second uplink communication (e.g., using TDM), may transmit the first uplink communication before requesting a grant for the second uplink communication, may request a grant for the first uplink communication before transmitting the second uplink communication, may request a grant for the first uplink communication before requesting a grant for the second uplink communication, and/or the like.

In some aspects, the prioritization rule may be different depending on a phase of the MBB handover procedure. For example, the prioritization rule may include a first rule in the handover execution phase 335 before an RRC connection has been established between the UE 305 and the target base station 315, and may include a second rule in the handover completion phase 340 after an RRC connection has been established between the UE 305 and the target base station 315.

As an example, the prioritization rule may indicate that, prior to establishment of an RRC connection between the UE 305 and the target base station 315 (e.g., during the handover execution phase 335), uplink random access communications with the target base station 315 have a higher priority than uplink communications with the source base station 310. As described above, an uplink random access communication (sometimes referred to as an uplink random access message) may include a random access preamble, a random access payload, an uplink RACH message (sometimes referred to as an uplink PRACH message), a PUSCH message transmitted during a random access procedure, msg1 of a four-step RACH procedure, msg3 of a four-step RACH procedure, msgA of a two-step RACH procedure, and/or the like. The uplink communications with the source base station 310 may include uplink data communications (e.g., data communications on the PUSCH), SRSs, PUCCH communications, non-data communications on the PUSCH (e.g., UCI, a CSI report, ACK/NACK feedback, an RLC status report, and/or the like), and/or the like. Additionally, or alternatively, the prioritization rule may indicate that uplink data communications to the source base station 310 have a higher priority (e.g., for TDM) than SRSs to the source base station 310, PUCCH communications to the source base station 310, non-data communications on the PUSCH to the source base station 310, and/or the like (e.g., during the handover execution phase 335).

As another example, the prioritization rule may indicate that, after establishment of an RRC connection between the UE 305 and the target base station 315 (e.g., during the handover completion phase 340), uplink communications with the target base station 315 have a higher priority than uplink communications with the source base station 310. The uplink communications with the target base station 315 may include uplink data communications (e.g., data communications on the PUSCH), SRSs, PUCCH communications, non-data communications on the PUSCH (e.g., UCI, a CSI report, ACK/NACK feedback, an RLC status report, and/or the like), and/or the like. Additionally, or alternatively, the prioritization rule may indicate that uplink data communications to the target base station 315 have a higher priority (e.g., for TDM) than SRSs to the target base station 315, PUCCH communications to the target base station 315, non-data communications on the PUSCH to the target base station 315, and/or the like (e.g., during the handover completion phase 340). Additionally, or alternatively, the prioritization rule may indicate that uplink communications to the source base station 310 are deactivated after establishment of an RRC connection between the UE 305 and the target base station 315 (e.g., during the handover completion phase 340).

As shown by reference number 425, the UE 305 may prioritize uplink communications for the source base station 310 and/or the target base station 315 based at least in part on the prioritization rule during the handover execution phase 335. For example, as shown by reference number 430, the UE 305 may prioritize an uplink random access message to the target base station 315 over an uplink communication with the source base station 310 by transmitting the uplink random access message before (e.g., earlier in time than) the uplink communication and/or before a grant for the uplink communication. The UE 305 may prioritize communications using TDM to transmit higher priority communications before lower priority communications.

As shown by reference number 435, after transmitting the random access message to the target base station 315, the UE 305 may request a grant associated with an uplink communication with the source base station 310. In some aspects, the UE 305 may request the grant based at least in part on receiving an indication that TDM is enabled for the MBB procedure. For example, the indication that TDM is enabled for the MBB procedure may indicate that the base stations 310, 315 will use grants to avoid scheduling or causing conflicting (e.g., simultaneous) uplink transmissions by the UE 305. In this way, TDM during the MBB handover procedure can be configured more flexibly than indicating a TDM pattern in the handover command.

As shown by reference number 440, the source base station 310 may transmit a grant associated with the uplink communication based at least in part on receiving the request for the grant. The grant may indicate a timing for a corresponding uplink communication scheduled by the uplink grant, such as a PUSCH communication, a PUCCH communication (e.g., ACK/NACK feedback), and/or the like. In some aspects, the grant is an uplink grant for an uplink data communication (e.g., a PUSCH communication), and the uplink grant indicates a timing between the uplink grant and the uplink data communication (e.g., a k2 value). Alternatively, the grant may be a downlink grant for a downlink data communication (e.g., a PDSCH communication), and the downlink grant may indicate a timing between the downlink data communication and uplink ACK/NACK feedback (e.g., a k1 value). In either case, the source base station 310 may configure the timing (e.g., the k1 value, the k2 value, and/or the like) for the uplink communication to avoid the second set of resources available for uplink communications between the UE 305 and the target base station 315. In this way, scheduling conflicts can be avoided. In some aspects, the source base station 310 may determine the timing based at least in part on a timing offset with respect to the target base station 315 (described above), thereby avoiding scheduling conflicts when the source base station 310 and the target base station 315 are not synchronized. Additionally, or alternatively, the source base station 310 may determine the timing based at least in part on a tuning delay required for the UE 305 to switch between the source base station 310 (e.g., a serving cell) and the target base station 315 (e.g., a target cell). In some aspects, the UE 305 may indicate the tuning delay in a capability report (e.g., transmitted to the source base station 310).

As shown by reference number 445, the UE 305 may transmit the uplink communication according to a timing indicated in the grant. Because the timing is coordinated between the source base station 310 and the target base station 315 to avoid scheduling conflicts, the UE 305 may be capable of using TDM for the uplink communication to the source base station 310 and one or more uplink communications to the target base station 315 (e.g., one or more random access messages, which may follow the random access message described in connection with reference number 430).

As shown by reference number 450, the UE 305 may prioritize uplink communications for the source base station 310 and/or the target base station 315 based at least in part on the prioritization rule during the handover completion phase 340. For example, as shown by reference number 455, the UE 305 may prioritize a first uplink communication with the target base station 315 over a second uplink communication with the source base station 310 by transmitting a grant for the first uplink communication before (e.g., earlier in time than) the second uplink communication and/or before a grant for the second uplink communication. The UE 305 may prioritize communications using TDM to transmit higher priority communications before lower priority communications. In some aspects, the UE 305 may request the grant based at least in part on receiving an indication that TDM is enabled for the MBB procedure, as described above.

As shown by reference number 460, the target base station 315 may transmit a grant associated with the first uplink communication based at least in part on receiving the request for the grant. The grant may indicate a timing for a corresponding uplink communication scheduled by the uplink grant, such as a PUSCH communication, a PUCCH communication (e.g., ACK/NACK feedback), and/or the like. In some aspects, the grant is an uplink grant for an uplink data communication (e.g., a PUSCH communication), and the uplink grant indicates a timing between the uplink grant and the uplink data communication (e.g., a k2 value). Alternatively, the grant may be a downlink grant for a downlink data communication (e.g., a PDSCH communication), and the downlink grant may indicate a timing between the downlink data communication and uplink ACK/NACK feedback (e.g., a k1 value). In either case, the target base station 315 may configure the timing (e.g., the k1 value, the k2 value, and/or the like) for the uplink communication to avoid the first set of resources configured for uplink communications between the UE 305 and the source base station 310 during the MBB handover procedure. In this way, scheduling conflicts can be avoided. In some aspects, the target base station 315 may determine the timing based at least in part on a timing offset with respect to the source base station 310 (described above), thereby avoiding scheduling conflicts when the source base station 310 and the target base station 315 are not synchronized. Additionally, or alternatively, the target base station 315 may determine the timing based at least in part on a tuning delay required for the UE 305 to switch between the source base station 310 (e.g., a serving cell) and the target base station 315 (e.g., a target cell). In some aspects, the UE 305 may indicate the tuning delay in a capability report transmitted to the source base station 310, and the source base station 310 may indicate the tuning delay to the target base station 315 (e.g., in the handover request).

As shown by reference number 465, the UE 305 may transmit the first uplink communication according to a timing indicated in the grant. Because the timing is coordinated between the source base station 310 and the target base station 315 to avoid scheduling conflicts, the UE 305 may be capable of using TDM for the first uplink communication with the target base station 315 and one or more uplink communications with the source base station 310 (e.g., which may be configured according to an RRC configuration message from the source base station 310 to the UE 305).

As shown by reference number 470, in some aspects, TDM may be deactivated (e.g., disabled) after completion of a random access procedure with the target base station 315. For example, TDM may be deactivated after the handover execution phase 335, during the handover completion phase 340, after an RRC connection between the UE 305 and the target base station 315 has been established, and/or the like. When TDM is deactivated, then uplink communication from the UE 305 to the source base station 310 may be deactivated. In this case, uplink communications to the target base station 315 may be prioritized over uplink communications to the source base station 310 due to the deactivation of uplink communications to the source base station 310.

Alternatively, as shown, TDM may remain active (e.g., activated, enabled, and/or the like) after completion of the random access procedure with the target base station 315 (e.g., after the handover execution phase 335, during the handover completion phase 340, after an RRC connection between the UE 305 and the target base station 315 has been established, and/or the like). In this case, a first uplink communication to the target base station 315 may be prioritized over a second uplink communication to the source base station 310 by transmitting the first uplink communication and/or a grant for the first uplink communication before transmitting the second uplink communication and/or a grant for the second uplink communication. As shown, the second uplink communication may include an SRS, a PUCCH communication, a PUSCH communication, and/or the like. In some aspects, the PUSCH communication may include a non-data communication, such as UCI, a CSI report, ACK/NACK feedback, an RLC status report, and/or the like.

In some aspects, TDM and uplink communications to the source base station 310 may initially be deactivated upon completion of a random access procedure with the target base station 315. However, if the UE 305 does not receive an indication to release the connection with the source base station 310 prior to expiration of a timer (e.g., a dormancy timer), then TDM may be reactivated and the UE 305 may transmit one or more uplink communications to the source base station 310 (e.g., the second uplink communication described above). In some aspects, the timer may be initialized upon completion of the random access procedure with the target base station 315.

By enabling TDM during the MBB handover procedure for uplink communications with the source base station 310 and the target base station 315, the UE 305 may be permitted to perform the MBB handover with minimal interruption to communications even if the UE 305 cannot simultaneously transmit via a first connection with the source base station 310 and a second connection with the target base station 315. Furthermore, by following the prioritization rule(s) described herein for TDM, the UE 305 may reduce latency and interruption time during the MBB handover. Furthermore, the UE 305 may be permitted to use TDM for communications on different links in a dynamic manner without being configured with a semi-static TDM pattern, thereby reducing latency that may otherwise be caused by using a semi-statically configured TDM pattern.

As indicated above, FIG. 4 is provided as an example. Other examples may differ from what is described with respect to FIG. 4.

Figure 5:
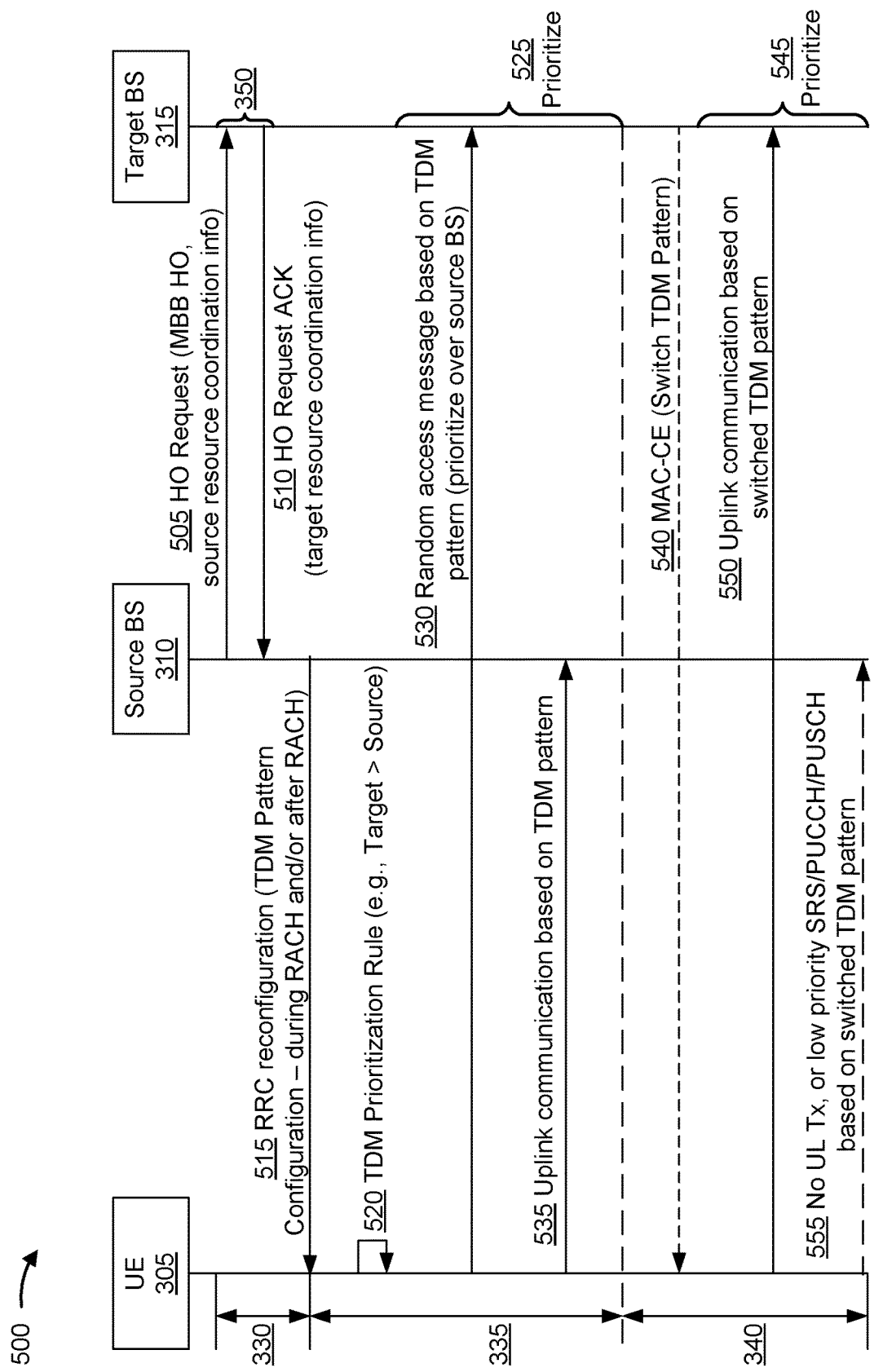
FIG. 5 is a diagram illustrating another example of time-division multiplexing of uplink communications during make-before-break handover, in accordance with various aspects of the present disclosure.

FIG. 5 is a diagram illustrating another example of time-division multiplexing of uplink communications during make-before-break handover, in accordance with various aspects of the present disclosure.

As described above, an MBB handover procedure may involve a UE 305, a source base station 310, a target base station 315, a UPF device 320, and an AMF device 325. As also described above, the MBB handover procedure may include a handover preparation phase 330, a handover execution phase 335, and a handover completion phase 340. During the handover preparation phase 330, the source base station 310 and the target base station 315 may communicate with one another to prepare for a handover of the UE 305, as described above in connection with reference number 350 of FIG. 3.

As shown by reference number 505, the source base station 310 may transmit, to the target base station 315, a handover request that instructs the target base station 315 to prepare for MBB handover, as described above in connection with FIG. 4. As shown by reference number 510, the target base station 315 may transmit, to the source base station 310, an ACK in response to the handover request (e.g., shown as a handover request ACK), as described above in connection with FIG. 4.

As shown by reference number 515, the source base station 310 may transmit an RRC reconfiguration message to the UE 305. The RRC reconfiguration message may include a handover command instructing the UE 305 to execute an MBB handover procedure from the source base station 310 to the target base station 315. As shown, the RRC reconfiguration message may indicate a TDM pattern configuration for TDM during the MBB handover procedure. The TDM pattern configuration may indicate a first set of resources available for uplink communications between the UE 305 and the target base station 315 and/or a second set of resources available for uplink communications between the UE 305 and the source base station 310.

In some aspects, the source base station 310 and/or the target base station 315 may determine the TDM pattern configuration based at least in part on a first set of resources configured for uplink communications between the UE 305 and the source base station 310 during the MBB handover procedure and/or the second set of resources available for uplink communications between the UE 305 and the target base station 315 during the MBB handover procedure. Additionally, or alternatively, the source base station 310 and/or the target base station 315 may determine the TDM pattern configuration based at least in part on a timing offset between the source base station 310 and the target base station 315 and/or a numerology, as described above in connection with FIG. 4. Additionally, or alternatively, the source base station 310 and/or the target base station 315 may determine the TDM pattern configuration based at least in part on a tuning delay required for the UE 305 to switch between the source base station 310 (e.g., a serving cell) and the target base station 315 (e.g., a target cell). In some aspects, the UE 305 may indicate the tuning delay in a capability report (e.g., transmitted to the source base station 310).

In some aspects, the source base station 310 may indicate the TDM pattern configuration based at least in part on a capability of the UE 305. For example, if the UE 305 does not support multiple transmit chains and/or multiple transmit antennas, then the source base station 310 may indicate the TDM pattern configuration. In some aspects, if the UE 305 supports multiple chains and/or multiple transmit antennas, then the source base station 310 may not indicate the TDM pattern configuration.

In some aspects, the source base station 310 may indicate multiple TDM pattern configurations in the RRC reconfiguration message. For example, the RRC reconfiguration message may include a first TDM pattern configuration to be used by the UE 305 during a random access procedure with the target base station 315 (e.g., prior to establishing an RRC connection with the target base station 315) and/or a second TDM pattern configuration to be used by the UE 305 after a random access procedure with the target base station 315 (e.g., after establishing an RRC connection with the target base station 315). In some aspects, the RRC reconfiguration message includes a single TDM pattern to be applied during the random access procedure and after the random access procedure.

As shown by reference number 520, the UE 305 may determine a prioritization rule for prioritizing uplink communications with the source base station 310 and the target base station 315, as described above in connection with FIG. 4. In some aspects, the UE 305 may determine the prioritization rule based at least in part on receiving the handover command with the TDM pattern configuration. Additional details regarding the prioritization rule are described above in connection with FIG. 4.

As shown by reference number 525, the UE 305 may prioritize uplink communications for the source base station 310 and/or the target base station 315 based at least in part on the prioritization rule during the handover execution phase 335. For example, as shown by reference number 530, the UE 305 may prioritize an uplink random access message to the target base station 315 over an uplink communication with the source base station 310 by transmitting the uplink random access message before (e.g., earlier in time than) the uplink communication and/or before a grant for the uplink communication. The UE 305 may prioritize communications using TDM to transmit higher priority communications before lower priority communications. The UE 305 may use the TDM pattern configuration (e.g., a TDM pattern configuration to be used during a random access procedure) to identify a set of resources to be used to transmit the uplink random access message to the target base station 315, and may transmit the uplink random access message to the target base station 315 in the identified set of resources.

As shown by reference number 535, after transmitting the random access message to the target base station 315, the UE 305 may transmit an uplink communication to the source base station 310 based at least in part on the TDM pattern configuration (e.g., a TDM pattern configuration to be used during a random access procedure). For example, the UE 305 may use the TDM pattern configuration to identify a set of resources to be used to transmit the uplink communication to the source base station 310, and may transmit the uplink communication to the source base station 310 in the identified set of resources. By using the TDM pattern, the UE 305 may identify different sets of resources for the uplink random access message to the target base station 315 and for the uplink communication to the source base station 310, thereby avoiding conflicting (e.g., simultaneous) uplink transmissions by the UE 305. In this way, TDM during the MBB handover procedure can be configured with reduced signaling overhead and/or with less processing by the base stations 310, 315 to dynamically determine timing for uplink communications.

As shown by reference number 540, in some aspects, if different TDM pattern configurations are indicated to the UE 305, then the target base station 315 may instruct the UE 305 to switch the TDM pattern configuration being used. For example, the TDM pattern configuration may be switched from a first TDM pattern configuration used during a random access procedure to a second TDM pattern configuration used after the random access procedure is complete. In some aspects, the instruction to switch the TDM pattern configuration may be indicated in a medium access control (MAC) control element (CE) (collectively, MAC-CE). As shown, the instruction to switch the TDM pattern configuration may be transmitted after the random access procedure is complete (e.g., after completion of the handover execution phase 335).

As shown by reference number 545, the UE 305 may prioritize uplink communications for the source base station 310 and/or the target base station 315 based at least in part on the prioritization rule during the handover completion phase 340. For example, as shown by reference number 550, the UE 305 may prioritize a first uplink communication with the target base station 315 over a second uplink communication with the source base station 310 by transmitting the first uplink communication and/or a grant for the first uplink communication before (e.g., earlier in time than) the second uplink communication and/or before a grant for the second uplink communication. The UE 305 may prioritize communications using TDM to transmit higher priority communications before lower priority communications. The UE 305 may use the TDM pattern configuration (e.g., a TDM pattern configuration to be used after a random access procedure) to identify a set of resources to be used to transmit the first uplink communication to the target base station 315, and may transmit the first uplink communication to the target base station 315 in the identified set of resources.

As shown by reference number 555, in some aspects, TDM may be deactivated (e.g., disabled) after completion of a random access procedure with the target base station 315, as described above in connection with FIG. 4. When TDM is deactivated, then uplink communications from the UE 305 to the source base station 310 may be deactivated. In this case, uplink communications to the target base station 315 may be prioritized over uplink communications to the source base station 310 due to the deactivation of uplink communications to the source base station 310.

Alternatively, as shown, TDM may remain active (e.g., activated, enabled, and/or the like) after completion of the random access procedure with the target base station 315, as described above in connection with FIG. 4. In this case, a first uplink communication to the target base station 315 may be prioritized over a second uplink communication to the source base station 310 by transmitting the first uplink communication and/or a grant for the first uplink communication before transmitting the second uplink communication and/or a grant for the second uplink communication. As shown, the second uplink communication may include an SRS, a PUCCH communication, a PUSCH communication, and/or the like. In some aspects, the PUSCH communication may include a non-data communication, such as UCI, a CSI report, ACK/NACK feedback, an RLC status report, and/or the like.

In some aspects, TDM and uplink communications to the source base station 310 may initially be deactivated upon completion of a random access procedure with the target base station 315. However, if the UE 305 does not receive an indication to release the connection with the source base station 310 prior to expiration of a timer (e.g., a dormancy timer), then TDM may be reactivated and the UE 305 may transmit one or more uplink communications to the source base station 310 (e.g., the second uplink communication described above). In some aspects, the timer may be initialized upon completion of the random access procedure with the target base station 315.

By enabling TDM during the MBB handover procedure for uplink communications with the source base station 310 and the target base station 315, the UE 305 may be permitted to perform the MBB handover with minimal interruption to communications, even if the UE 305 cannot simultaneously transmit via a first connection with the source base station 310 and a second connection with the target base station 315. Furthermore, by following the prioritization rule(s) described herein for TDM, the UE 305 may reduce latency and interruption time during the MBB handover. Furthermore, the UE 305 may be permitted to use TDM for communications using a semi-statically-configured TDM pattern, thereby reducing signaling overhead and/or conserving base station resources (e.g., processing resources, memory resources, and/or the like) as compared to using a dynamically-configured timing for uplink TDM communications.

As indicated above, FIG. 5 is provided as an example. Other examples may differ from what is described with respect to FIG. 5.

Figure 6:
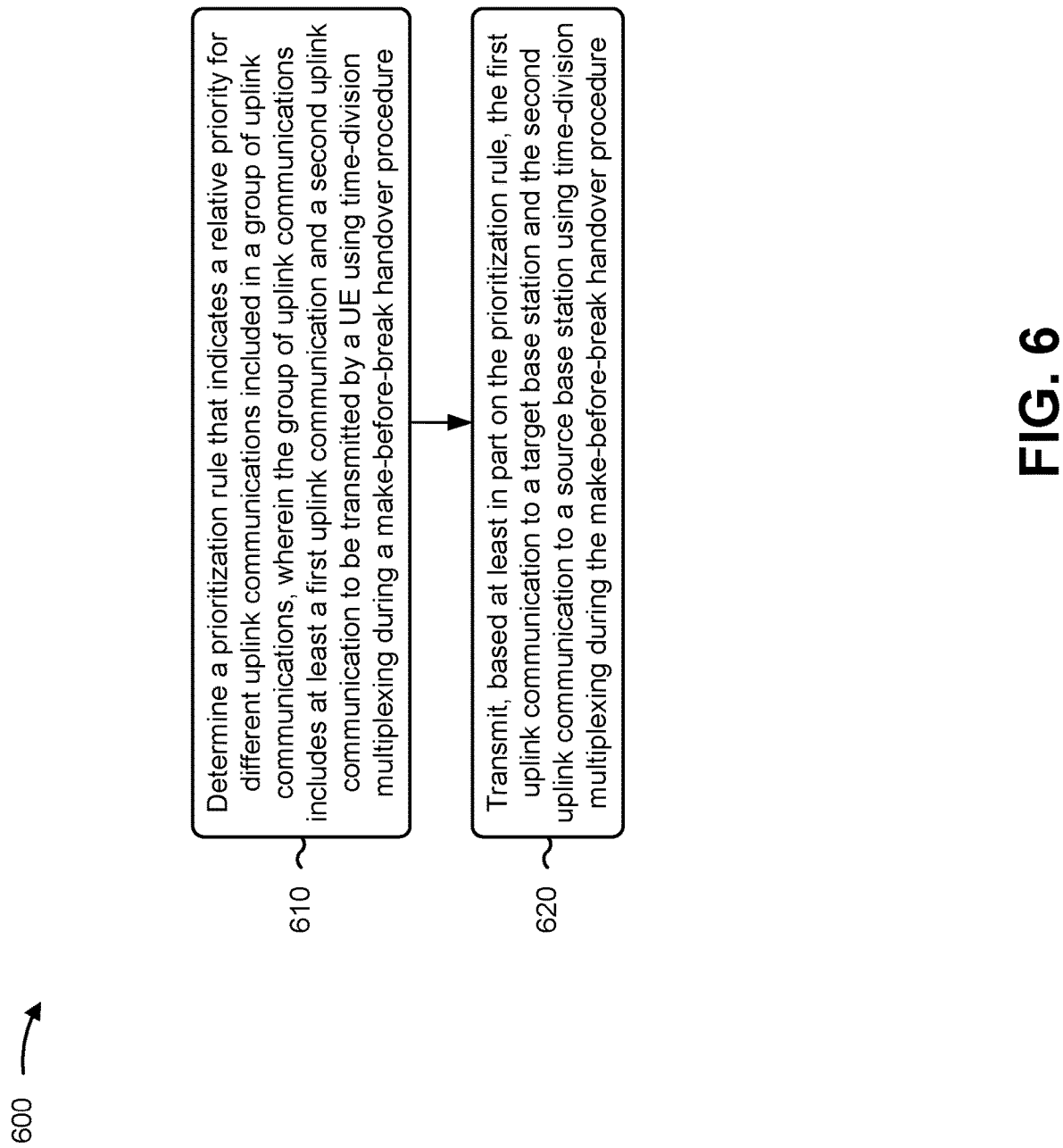
FIGS. 6-8 are diagrams illustrating example processes relating to time-division multiplexing of uplink communications during make-before-break handover, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120, UE 305, and/or the like) performs operations associated with time-division multiplexing of uplink communications during make-before-break handover.

As shown in FIG. 6, in some aspects, process 600 may include determining a prioritization rule that indicates a relative priority for different uplink communications included in a group of uplink communications, wherein the group of uplink communications includes at least a first uplink communication and a second uplink communication to be transmitted by the UE using time-division multiplexing during a make-before-break handover procedure (block 610). For example, the UE (e.g., using receive processor 258, transmit processor 264, controller/processor 280, memory 282, and/or the like) may determine a prioritization rule that indicates a relative priority for different uplink communications included in a group of uplink communications, as described above. In some aspects, the group of uplink communications includes at least a first uplink communication and a second uplink communication to be transmitted by the UE using time-division multiplexing during a make-before-break handover procedure.

As further shown in FIG. 6, in some aspects, process 600 may include transmitting, based at least in part on the prioritization rule, the first uplink communication to a target base station and the second uplink communication to a source base station using time-division multiplexing during the make-before-break handover procedure (block 620). For example, the UE (e.g., using transmit processor 264, controller/processor 280, memory 282, and/or the like) may transmit, based at least in part on the prioritization rule, the first uplink communication to a target base station and the second uplink communication to a source base station using time-division multiplexing during the make-before-break handover procedure, as described above.

Process 600 may include additional aspects, such as any single aspect or any combination of aspects described below and/or in connection with one or more other processes described elsewhere herein.

In a first aspect, process 600 includes requesting a grant for at least one of the first uplink communication with the target base station or the second uplink communication with the source base station based at least in part on the prioritization rule.

In a second aspect, alone or in combination with the first aspect, process 600 includes receiving, from the source base station, an indication of a time-division multiplexing pattern configuration to be used for the time-division multiplexing, and the first uplink communication and the second uplink communication are transmitted further based at least in part on the time-division multiplexing pattern configuration.

In a third aspect, alone or in combination with one or more of the first and second aspects, the prioritization rule is based at least in part on whether a radio resource control connection has been established between the UE and the target base station.

In a fourth aspect, alone or in combination with one or more of the first through third aspects, the prioritization rule indicates that, prior to establishment of a radio resource control connection between the UE and the target base station, uplink random access communications with the target base station have a higher priority than uplink communications with the source base station.

In a fifth aspect, alone or in combination with one or more of the first through fourth aspects, the prioritization rule indicates that, after establishment of a radio resource control connection between the UE and the target base station, uplink communications with the target base station have a higher priority than uplink communications with the source base station.

In a sixth aspect, alone or in combination with one or more of the first through fifth aspects, process 600 includes transmitting, to the source base station, an indication of a timing offset with respect to the target base station.

In a seventh aspect, alone or in combination with one or more of the first through sixth aspects, the time-division multiplexing is deactivated after completion of a random access procedure with the target base station, and uplink channels are deactivated for communications between the UE and the source base station based at least in part on deactivating the time-division multiplexing.

In an eighth aspect, alone or in combination with one or more of the first through seventh aspects, the time-division multiplexing is reactivated after the deactivation based at least in part on a determination that the UE has not received an indication to release a connection with the source base station prior to expiration of a timer.

In a ninth aspect, alone or in combination with one or more of the first through eighth aspects, the time-division multiplexing is active after completion of a random access procedure with the target base station, and the UE is configured to transmit at least one of a sounding reference signal, a physical uplink control channel communication, or a physical uplink shared channel communication to both the target base station and the source base station while the time-division multiplexing is active.

In a tenth aspect, alone or in combination with one or more of the first through ninth aspects, the physical uplink shared channel communication includes at least one of a non-data communication, uplink control information, a channel state information report, acknowledgement or negative acknowledgement feedback, a radio link control status report, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
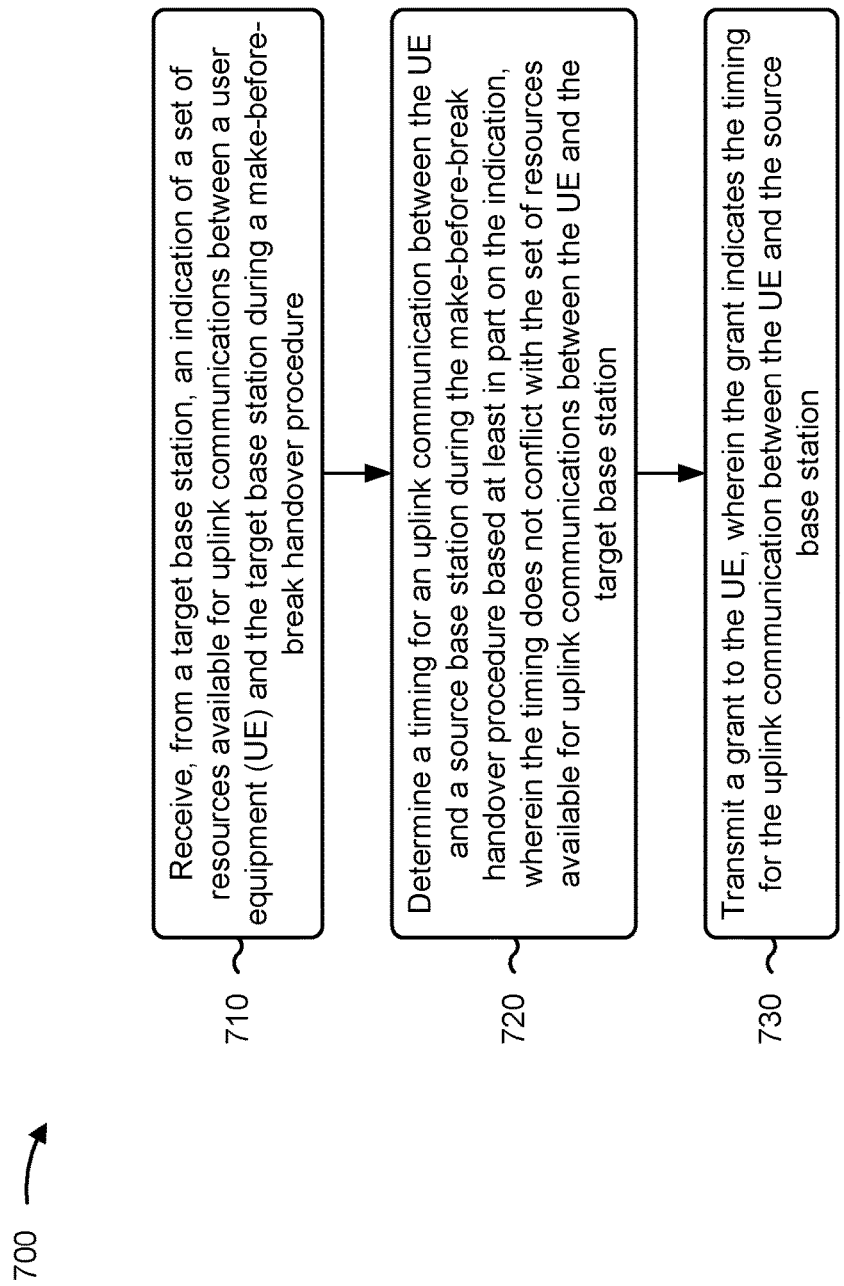

FIG. 7 is a diagram illustrating an example process 700 performed, for example, by a source base station, in accordance with various aspects of the present disclosure. Example process 700 is an example where a source base station (e.g., base station 110, source base station 310, and/or the like) performs operations associated with time-division multiplexing of uplink communications during make-before-break handover.

As shown in FIG. 7, in some aspects, process 700 may include receiving, from a target base station, an indication of a set of resources available for uplink communications between a UE and the target base station during a make-before-break handover procedure (block 710). For example, the source base station (e.g., using receive processor 238, controller/processor 240, memory 242, and/or the like) may receive, from a target base station, an indication of a set of resources available for uplink communications between a UE and the target base station during a make-before-break handover procedure, as described above.

As further shown in FIG. 7, in some aspects, process 700 may include determining a timing for an uplink communication between the UE and the source base station during the make-before-break handover procedure based at least in part on the indication, wherein the timing does not conflict with the set of resources available for uplink communications between the UE and the target base station (block 720). For example, the source base station (e.g., using transmit processor 220, receive processor 238, controller/processor 240, memory 242, and/or the like) may determine a timing for an uplink communication between the UE and the source base station during the make-before-break handover procedure based at least in part on the indication, as described above. In some aspects, the timing does not conflict with the set of resources available for uplink communications between the UE and the target base station.

As further shown in FIG. 7, in some aspects, process 700 may include transmitting a grant to the UE, wherein the grant indicates the timing for the uplink communication between the UE and the source base station (block 730). For example, the source base station (e.g., using transmit processor 220, controller/processor 240, memory 242, and/or the like) may transmit a grant to the UE, as described above. In some aspects, the grant indicates the timing for the uplink communication between the UE and the source base station.

Process 700 may include additional aspects, such as any single aspect or any combination of aspects described below and/or in connection with one or more other processes described elsewhere herein.

In a first aspect, process 700 includes transmitting, to the UE, a configuration message that indicates that time-division multiplexing is enabled for the make-before-break handover procedure.

In a second aspect, alone or in combination with the first aspect, process 700 includes receiving, from the UE, a request for the grant during the make-before-break handover procedure and based at least in part on transmitting the configuration message.

In a third aspect, alone or in combination with one or more of the first and second aspects, the grant is an uplink grant, the uplink communication is an uplink data communication, and the timing is between the uplink grant and the uplink data communication.

In a fourth aspect, alone or in combination with one or more of the first through third aspects, the grant is a downlink grant, the uplink communication is ACK/NACK feedback, and the timing is between a downlink communication scheduled by the grant and the ACK/NACK feedback.

In a fifth aspect, alone or in combination with one or more of the first through fourth aspects, process 700 includes receiving, from the UE, an indication of a timing offset with respect to the target base station; and identifying the set of resources based at least in part on the timing offset.

In a sixth aspect, alone or in combination with one or more of the first through fifth aspects, process 700 includes transmitting an indication of the timing offset to the target base station, and the set of resources are based at least in part on the timing offset.

In a seventh aspect, alone or in combination with one or more of the first through sixth aspects, process 700 includes transmitting an indication of a numerology, configured for communications between the source base station and the UE, to the target base station, and the set of resources are based at least in part on the numerology.

In an eighth aspect, alone or in combination with one or more of the first through seventh aspects, the set of resources includes a set of random access channel resources configured for the target base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
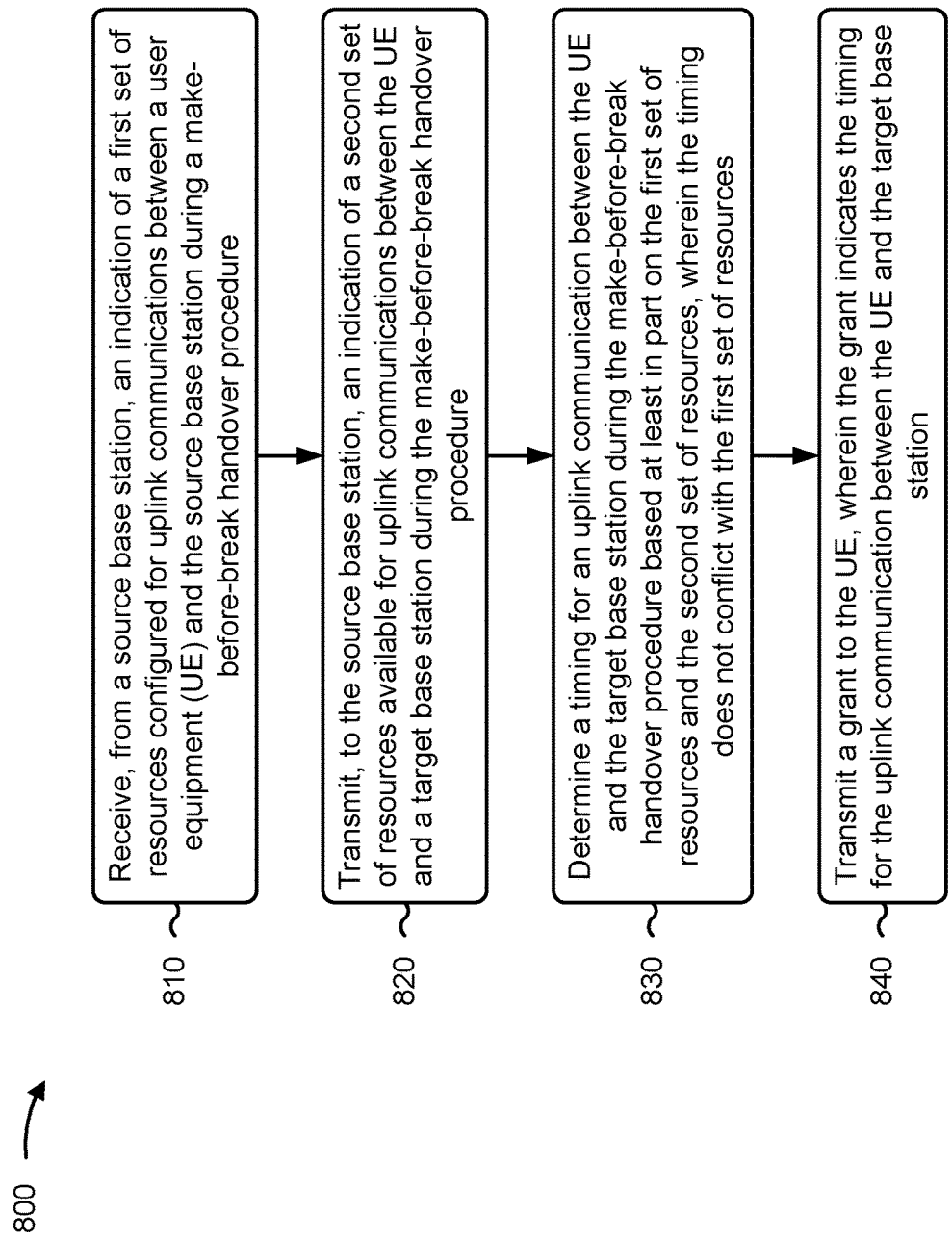

FIG. 8 is a diagram illustrating an example process 800 performed, for example, by a target base station, in accordance with various aspects of the present disclosure. Example process 800 is an example where a target base station (e.g., base station 110, target base station 315, and/or the like) performs operations associated with time-division multiplexing of uplink communications during make-before-break handover.

As shown in FIG. 8, in some aspects, process 800 may include receiving, from a source base station, an indication of a first set of resources configured for uplink communications between a UE and the source base station during a make-before-break handover procedure (block 810). For example, the target base station (e.g., using receive processor 238, controller/processor 240, memory 242, and/or the like) may receive, from a source base station, an indication of a first set of resources configured for uplink communications between a UE and the source base station during a make-before-break handover procedure, as described above.

As further shown in FIG. 8, in some aspects, process 800 may include transmitting, to the source base station, an indication of a second set of resources available for uplink communications between the UE and the target base station during the make-before-break handover procedure (block 820). For example, the target base station (e.g., using transmit processor 220, controller/processor 240, memory 242, and/or the like) may transmit, to the source base station, an indication of a second set of resources available for uplink communications between the UE and the target base station during the make-before-break handover procedure, as described above.

As further shown in FIG. 8, in some aspects, process 800 may include determining a timing for an uplink communication between the UE and the target base station during the make-before-break handover procedure based at least in part on the first set of resources and the second set of resources, wherein the timing does not conflict with the first set of resources (block 830). For example, the target base station (e.g., using transmit processor 220, receive processor 238, controller/processor 240, memory 242, and/or the like) may determine a timing for an uplink communication between the UE and the target base station during the make-before-break handover procedure based at least in part on the first set of resources and the second set of resources, as described above. In some aspects, the timing does not conflict with the first set of resources.

As further shown in FIG. 8, in some aspects, process 800 may include transmitting a grant to the UE, wherein the grant indicates the timing for the uplink communication between the UE and the target base station (block 840). For example, the target base station (e.g., using transmit processor 220, controller/processor 240, memory 242, and/or the like) may transmit a grant to the UE, as described above. In some aspects, the grant indicates the timing for the uplink communication between the UE and the target base station.

Process 800 may include additional aspects, such as any single aspect or any combination of aspects described below and/or in connection with one or more other processes described elsewhere herein.

In a first aspect, the grant is transmitted based at least in part on receiving a UE request for the grant during the make-before-break handover procedure.

In a second aspect, alone or in combination with the first aspect, the grant is an uplink grant, the uplink communication is an uplink data communication, and the timing is between the uplink grant and the uplink data communication.

In a third aspect, alone or in combination with one or more of the first and second aspects, the grant is a downlink grant, the uplink communication is ACK/NACK feedback, and the timing is between a downlink communication scheduled by the grant and the ACK/NACK feedback.

In a fourth aspect, alone or in combination with one or more of the first through third aspects, process 800 includes receiving an indication of a timing offset with respect to the source base station; and identifying the second set of resources based at least in part on the timing offset.

In a fifth aspect, alone or in combination with one or more of the first through fourth aspects, process 800 includes receiving an indication of a numerology configured for communications between the source base station and the UE, and identifying the second set of resources based at least in part on the numerology.

In a sixth aspect, alone or in combination with one or more of the first through fifth aspects, the second set of resources includes a set of random access channel resources configured for the target base station.

In a seventh aspect, alone or in combination with one or more of the first through sixth aspects, the first set of resources includes one or more resources configured for at least one of a sounding reference signal configured for the source base station and the UE, a physical uplink control channel communication configured for the source base station and the UE, or a physical uplink shared channel communication configured for the source base station and the UE.

In an eighth aspect, alone or in combination with one or more of the first through seventh aspects, the physical uplink shared channel communication includes at least one of a non-data communication, uplink control information, a channel state information report, acknowledgement or negative acknowledgement feedback, a radio link control status report, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors, coupled to the one or more memories, configured to cause the UE to:
      receive a message indicating that the UE is to execute a make-before-break handover procedure;
      transmit, during the make-before-break handover procedure and based at least in part on a prioritization rule, a first uplink communication to a target base station,
         wherein the prioritization rule indicates a relative priority for different uplink communications included in a group of uplink communications, and
         wherein the group of uplink communications includes at least the first uplink communication to be transmitted by the UE to the target base station and a second uplink communication to be transmitted by the UE to a source base station during the make-before-break handover procedure; and
      deactivate the second uplink communication, wherein the first uplink communication is prioritized over the second uplink communication based at least in part on the second uplink communication being deactivated.

2. The UE of claim 1, wherein the prioritization rule indicates that, prior to establishment of a radio resource control connection between the UE and the target base station, uplink random access communications with the target base station have a higher priority than uplink communications with the source base station.

3. The UE of claim 1, wherein the prioritization rule indicates that, after establishment of a radio resource control connection between the UE and the target base station, uplink communications with the target base station have a higher priority than uplink communications with the source base station.

4. The UE of claim 1, wherein the message comprises a radio resource control (RRC) message.

5. The UE of claim 1, wherein the first uplink communication comprises a physical random access channel (PRACH) communication and the second uplink communication comprises a physical uplink shared channel (PUSCH) communication, a physical uplink control channel (PUCCH) communication, or a sounding reference signal (SRS) communication.

6. The UE of claim 1, wherein the one or more processors are further configured to cause the UE to:
   request a grant for the first uplink communication with the target base station.

7. The UE of claim 1, wherein time-division multiplexing is active after completion of a random access procedure with the target base station, and the UE is configured to transmit at least one of a sounding reference signal (SRS), a physical uplink control channel (PUCCH) communication, or a physical uplink shared channel (PUSCH) communication to both the target base station and the source base station while the time-division multiplexing is active.

8. The UE of claim 7, wherein the UE is configured to transmit the PUSCH communication, and wherein the PUSCH communication includes at least one of a non-data communication, uplink control information, a channel state information report, acknowledgement or negative acknowledgement feedback, or a radio link control status report.

9. The UE of claim 1, wherein the prioritization rule is based at least in part on whether a radio resource control connection has been established between the UE and the target base station.

10. The UE of claim 1, wherein the one or more processors are further configured to cause the UE to:
  transmit, to the source base station, an indication of a timing offset with respect to the target base station.

11. A method of wireless communication performed by a user equipment (UE), comprising:
  receiving a message indicating that the UE is to execute a make-before-break handover procedure;
  transmitting, during the make-before-break handover procedure and based at least in part on a prioritization rule, a first uplink communication to a target base station,
    wherein the prioritization rule indicates a relative priority for different uplink communications included in a group of uplink communications, and
    wherein the group of uplink communications includes at least the first uplink communication to be transmitted by the UE to the target base station and a second uplink communication to be transmitted by the UE to a source base station during the make-before-break handover procedure; and
  deactivating the second uplink communication, wherein the first uplink communication is prioritized over the second uplink communication based at least in part on the second uplink communication being deactivated.

12. The method of claim 11, wherein the prioritization rule indicates that, prior to establishment of a radio resource control connection between the UE and the target base station, uplink random access communications with the target base station have a higher priority than uplink communications with the source base station.

13. The method of claim 11, wherein the prioritization rule indicates that, after establishment of a radio resource control connection between the UE and the target base station, uplink communications with the target base station have a higher priority than uplink communications with the source base station.

14. The method of claim 11, wherein the message comprises a radio resource control (RRC) message.

15. The method of claim 11, wherein the first uplink communication comprises a physical random access channel (PRACH) communication and the second uplink communication comprises a physical uplink shared channel (PUSCH) communication, a physical uplink control channel (PUCCH) communication, or a sounding reference signal (SRS) communication.

16. The method of claim 11, further comprising:
  requesting a grant for the first uplink communication with the target base station.

17. The method of claim 11, wherein time-division multiplexing is active after completion of a random access procedure with the target base station, and the UE is configured to transmit at least one of a sounding reference signal (SRS), a physical uplink control channel (PUCCH) communication, or a physical uplink shared channel (PUSCH) communication to both the target base station and the source base station while the time-division multiplexing is active.

18. The method of claim 17, wherein the UE is configured to transmit the PUSCH communication, and wherein the PUSCH communication includes at least one of a non-data communication, uplink control information, a channel state information report, acknowledgement or negative acknowledgement feedback, or a radio link control status report.

19. The method of claim 11, wherein the prioritization rule is based at least in part on whether a radio resource control connection has been established between the UE and the target base station.

20. The method of claim 11, further comprising:
  transmitting, to the source base station, an indication of a timing offset with respect to the target base station.

* * * * *